(12) United States Patent
Loaiza et al.

(10) Patent No.: US 6,804,671 B1
(45) Date of Patent: Oct. 12, 2004

(54) PLUGGABLE TABLESPACES FOR DATABASE SYSTEMS

(75) Inventors: Juan R. Loaiza, San Carlos, CA (US); Hasan Rizvi, San Carlos, CA (US); J. William Lee, Foster City, CA (US); William H. Bridge, Jr., Alameda, CA (US); Jonathan D. Klein, Redwood City, CA (US); Alex Tsukerman, Foster City, CA (US); Gianfranco Putzolu, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 9 days.

(21) Appl. No.: 10/353,381

(22) Filed: Jan. 28, 2003

Related U.S. Application Data

(60) Division of application No. 09/675,195, filed on Sep. 29, 2000, now Pat. No. 6,549,901, which is a continuation-in-part of application No. 08/865,693, filed on May 30, 1997, now Pat. No. 6,272,503.

(51) Int. Cl.$^7$ .......................... G06F 17/30; G06F 12/00
(52) U.S. Cl. .......................... 707/7; 707/200; 707/101; 711/1; 711/207; 711/209
(58) Field of Search .................. 707/1–2, 7–8, 707/100–102, 200–206; 711/1, 3, 200, 205–209; 715/500.1

(56) References Cited

U.S. PATENT DOCUMENTS

| | | | | |
|---|---|---|---|---|
| 5,222,235 A | * | 6/1993 | Hintz et al. .................. | 707/101 |
| 5,396,623 A | * | 3/1995 | McCall et al. .............. | 707/101 |
| 5,454,101 A | * | 9/1995 | Mackay et al. ................ | 707/3 |
| 5,551,020 A | * | 8/1996 | Flax et al. ................... | 707/101 |
| 5,579,516 A | * | 11/1996 | Van Maren et al. ............ | 707/1 |
| 5,692,174 A | * | 11/1997 | Bireley et al. ................ | 707/3 |
| 5,787,445 A | * | 7/1998 | Daberko ..................... | 707/205 |
| 5,787,446 A | * | 7/1998 | Dang et al. ................. | 707/205 |

* cited by examiner

Primary Examiner—Alford Kindred
(74) Attorney, Agent, or Firm—Marcel K. Bingham; Hickman Palermo Truong & Becker LLP

(57) ABSTRACT

A pluggable tablespace is enabled by logically partitioning a database into a set of tablespaces and storing all of the tablespaces disk pointers in tablespace-relative format. A pluggable set of tablespaces is unplugged by generating the associated metadata, and making a binary copy of the tablespaces. The pluggable set of tablespaces is plugged into a target database by making the pluggable set accessible to the target database and incorporating the associated metadata, without patching any of the disk pointers.

20 Claims, 14 Drawing Sheets

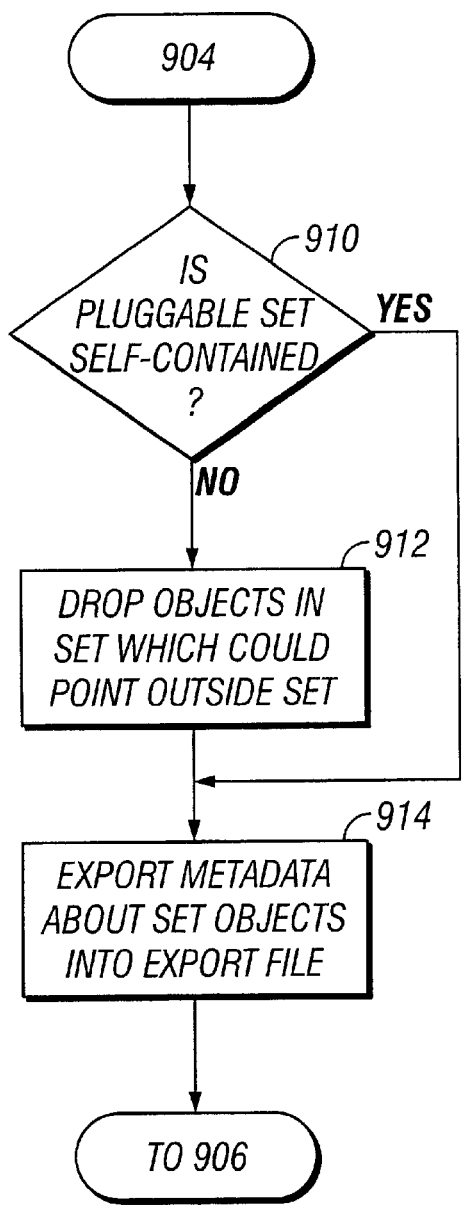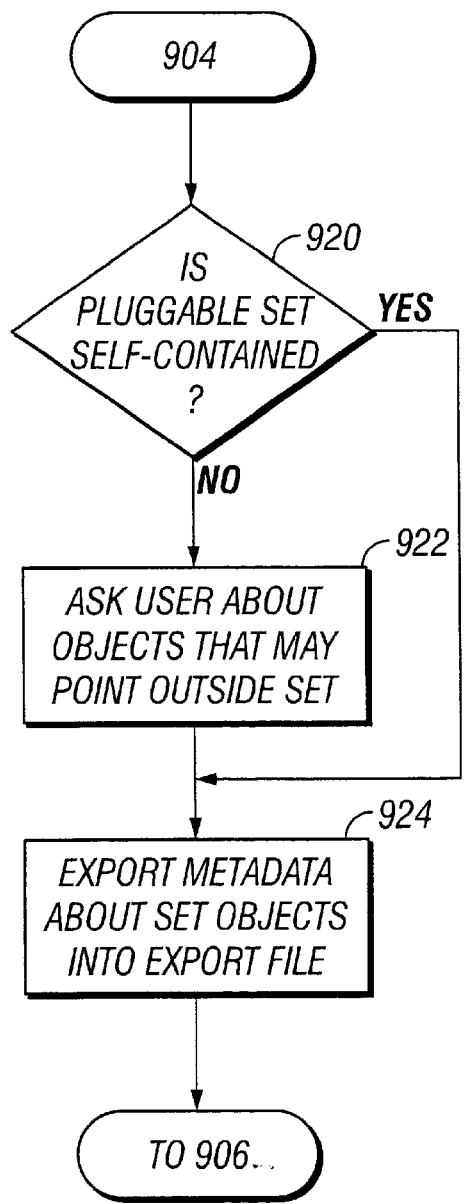
FIG. 9B
FIG. 9C

PLUGGABLE TABLESPACES FOR DATABASE SYSTEMS

RELATED APPLICATIONS

The present application is a divisional of U.S. application Ser. No. 09/675,195 now U.S Pat. No. 6,549,901, entitled Using Transportable Tablespaces for Hosting Data of Multiple Users, filed on Sep. 29, 2000 by Juan R. Loaiza, et al., the contents of which are hereby incorporated herein by reference;

The present application is a continuation-in-part of U.S. application Ser. No. 08/865,693 now U.S. Pat. No. 6,272,503, entitled Tablespace-Relative Database Pointers, filed on May 30, 1997 by William H. Bridge, Jr., et al., the contents of which are hereby incorporated herein by reference and referred to as Tablespace-Relative Database Pointers.

FIELD OF THE INVENTION

The present invention relates to database systems, and in particular, managing data of multiple users in a manner that enables efficient exportation of the data.

BACKGROUND OF THE INVENTION

Use of commercial off-the-shelf applications ("packaged applications") has proliferated. Companies are buying packaged applications instead of developing in house applications, avoiding the higher cost associated with developing their own in house applications. The kinds of packaged applications that may be purchased include applications for financial processing, manufacturing work-flow, human resources, and customer relationship management.

Not only are companies buying packaged applications, they are employing service companies to maintain the packaged applications and the computer systems upon which they run. One technique used by service companies to maintain and operate packaged applications is referred to as application hosting. A service company maintains applications for multiple companies on one or more computer systems, using the same computer infrastructure to run all the packaged applications. The term infrastructure refers to both hard components (e.g. computers), and software components, (e.g. operating systems and database systems). A "host customer" may access an application via, for example, the Internet, or an extended intranet. Application hosting can reduce the cost of managing applications because its allows companies to share the resources needed to run a packaged application, resources which include computer components, application experts, and computer administrative support personnel, all of which are needed to operate a packaged application.

One resource which may be shared is the database system. An application host may use a single database system to store data for multiple host customers. Use of a single database system reduces the need to operate a heterogeneous set of database systems, which may require the use of different database system software, hardware, and experts.

Eventually, the data of an application host customer may have to be moved to another database system. There may be a variety of reasons for moving the data. The host customer may simply wish to switch application hosts, may wish to operate their own application in-house, or the application host may simply be moving the data as part of a reconfiguration of the computer systems operated by the application host. With respect to a particular database system, the process of moving data to another database system is referred to as exporting.

A conventional technique for exporting data is the command generation technique. Under the command generation technique, the exporting database system generates a file of insert commands. The insert commands conform to a standard database language, such as structure query language ("SQL"). For each record being exported, an insert command specifies the creation of a record with the values needed to generate a copy of the record being exported. To import the data, another database, that is capable of executing commands written in the standard database language, scans the file, executing each insert command.

Executing an insert command for each record to export is typically a slow process, one which may for larger databases span days. While data is being exported, access to the data is restricted; consequently, the business operations of a customer host, which require access to the data, may be significantly impacted. Thus, conventional techniques for exporting data may significantly burden a host customer.

Based on the foregoing, it is clearly desirable to not only provide a mechanism that allows exporting data for a particular host customer to another database system, but to provide a mechanism for exporting data that is quicker and more efficient than conventional techniques, such as the command generation technique.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 9(a), 9(b), and 9(c) are flowcharts illustrating the operation of unplugging a set of tablespaces from a database according to embodiments of the present invention.

DETAILED DESCRIPTION OF THE PREFERRED EMBODIMENT

A method and apparatus is described for managing data of multiple users in a manner that enables efficient exportation of the data. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Described herein are mechanisms that may be used to support efficient exportation of user data stored in a database system. Specifically, a database system is configured to store data in manner that enables data for a particular user to be exported efficiently using a mechanism referred to as transportable tablespaces. Transportable tablespaces will be explained in greater detail later.

Figure 1:
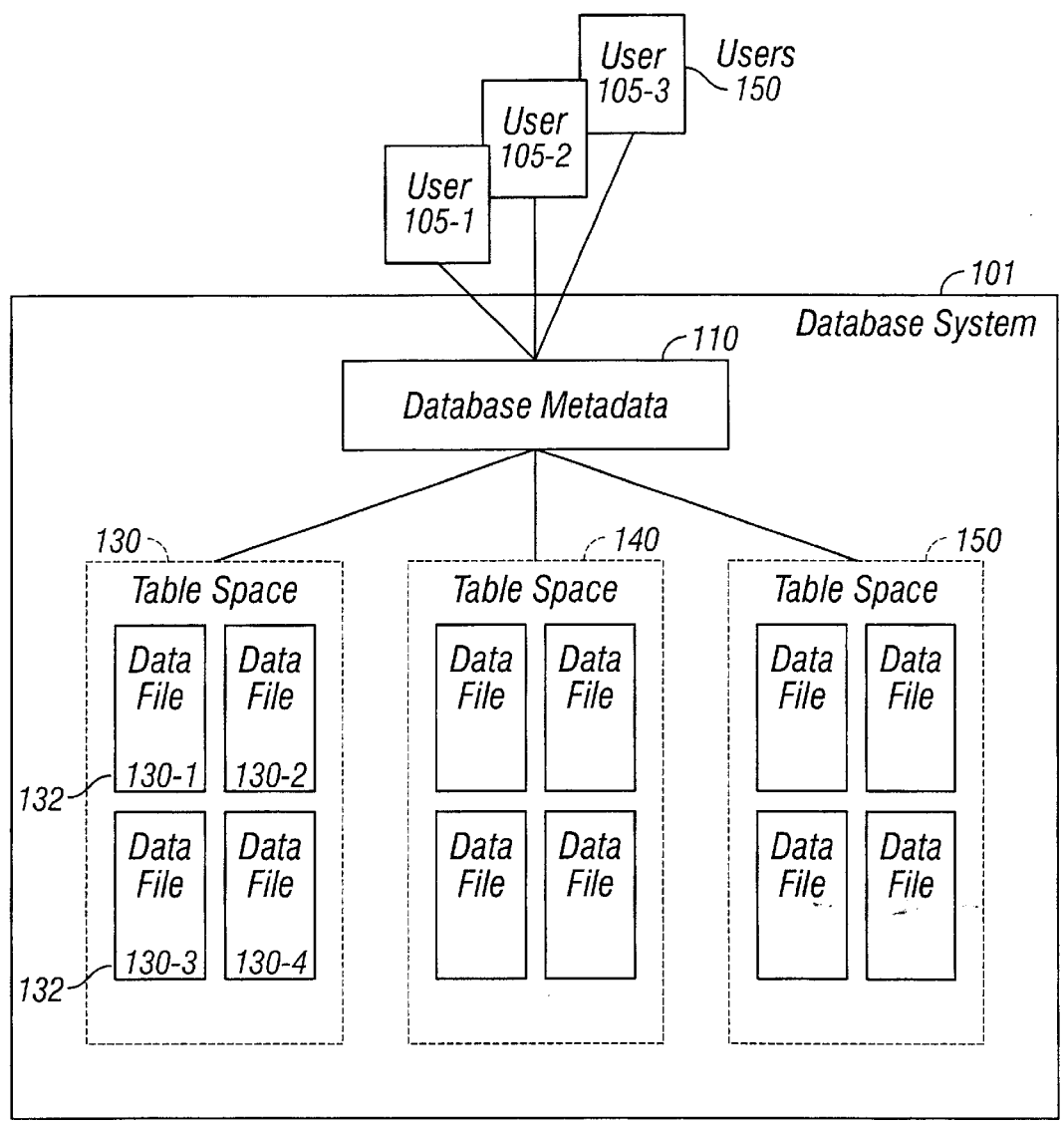
FIG. 1 is a block diagram that depicts a database architecture for storing users' data in separate tablespaces.

FIG. 1 is a block diagram that provides an overview of a database system configured according to the techniques described herein. Database system 101 processes and stores data for each of users 105. Users 105 includes user 105-1, 105-2, and 105-3. Users 105 may not only include individual users, but may include users that are collections of individuals or computers. Database system 101 organizes data for users 105 so that data for each are stored in different tablespaces. A tablespace is a collection of storage containers (e.g. data files) used to store data for database objects. Database objects are objects managed by a database system. Examples of database objects include tables, indexes, and code modules which may be executed by a database system. A database object may be referred to as being in a particular tablespace when the tablespace holds data for the database object.

Data for user 105-1 is stored in one or more data files 132, which belong to tablespace 130. For example, data files 132-1, 132-2, 132-3, and 132-4 may hold data for an employee table of employees employed by user 105-1. Likewise, data for user 105-2 and 105-3 are stored in tablespace 140 and 150 respectively.

Database metadata 110 is meta data the describes the configuration of a database system. Database metadata 110 defines, for example, database objects (e.g. tables and indexes for tables), tablespaces, and what tablespaces to use to store data for a table or index. Database metadata is generated in response to receiving data definition commands from a user. A user issues database command to a database system to modifying the configuration of database system, specifying, for example, the database objects that reside in the database system, the attribute parameters that define database objects, and tablespaces that hold data for the database objects. Data definition commands must conform to a data definition language recognized by a database system, such as SQL.

To store a data for a user in particular tablespace, the database system may be configured in a variety or ways. Several of these configurations shall be discussed in greater detail.

Using Transportable Tablespaces

Transportable tables spaces refers to a technique for transferring data between database systems using a process that includes moving or copying tablespaces and altering the database metadata of either the database from which the tablespace is transported ("source database") or the database to which the tablespace is transported ("target database"). Examples of such techniques are described in Pluggable Tablespaces and Tablespace-Relative Database Pointers.

The database metadata may be altered using a variety of techniques. Utilities available on the source system may be executed to export the metadata into a file, and utilities on the target database system may be executed to reconstruct metadata from the file. Alternately, exported metadata could be included with the data being transported in the tablespace, and the source database would reconstruct the metadata from the data included in the tablespace. A user could manually reconstruct the metadata on the source database system. Finally, utilities on the source database system could examine the data in the tablespaces to derive the metadata.

Tablespaces that may be transported in this manner should be "self contained". A set of tablespaces is self contained when there are no pointers inside any data item in the set that point to any item outside the set. For example, if the tablespace holds data for an index of a table in another tablespace, then the tablespace is not self contained. If a set of tablespaces is not self-contained, the data in the tablespace may be modified to make the set of tablespaces self contained. In addition, the makeup of the set of tablespaces can be modified, by, for example, removing tablespaces from the set or adding additional tablespaces. It should be understood that the present invention is not limited to any particular technique for transportable tablespaces.

Establishing a User-to-tablespace Mapping Using Partitioning

Figure 2:
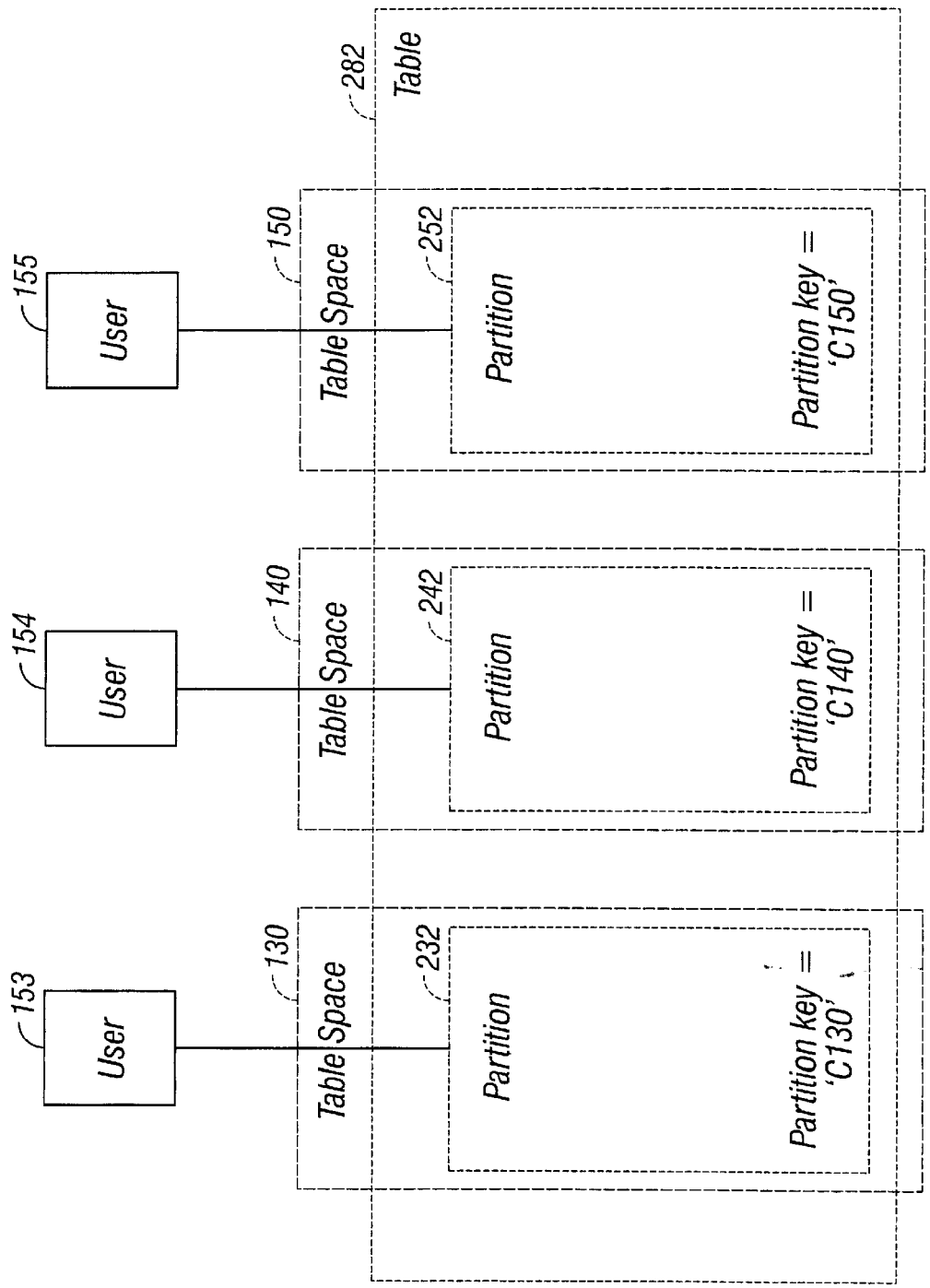
FIG. 2 is a block diagram that depicts use of partitioning in a database system to store users' data in separate tablespaces.

Data for a user may be stored in a particular portion of a table through a technique known as partitioning. In partitioning, an object, such as a database table, is divided up into sub-tables, referred to as "partitions". FIG. 2 is a block diagram that illustrates use of partitions to store data for one user separate from the data for other users, even though the data for all users resides in the same table.

Table 280 is divided into partitions 232, 242, and 252. Partition 232 is in tablespace 130, partition 242 is in tablespace 140, and partition 252 is in tablespace 150. Database metadata 110 defines what partitions exist for a table and in which tablespace the partitions reside.

In addition, database metadata 110 defines partitioning criteria, which is used to select which partition to store a particular record (e.g. row) in table 280. Partitioning criteria may be based on (1) values in a particular field in a table, referred to as a partition key, and (2) rules that determine where a record belongs that has a particular value for the partition key.

For purposes of illustration, table 280 may contain a field Company ID. Company ID is used to identify a user. Database metadata 210 defines Company ID as the partition key for table 280, and defines partitioning criteria specifying that records with a partition key value equal to 'C130' are stored in partition 232, records with a partition key value equal to 'C140' in partition 242, and records with a partition key value equal to 'C150' in partition 252. Because database metadata 110 specifies that partition 232 is in tablespace 130, records that have a partition key value equal to 'C130' and that are associated with user 153 are stored in tablespace 130. Likewise, records associated with user 154 are stored in partition 242, and records associated with user 155 are stored in partition 252.

Establishing a User-to-tablespace Mapping Using Database Schemas

Data for a user may be stored in a particular tablespace through the use of database schemas. A database schema is a set of database objects. Typically, database metadata defines a schema and the collection of data objects that belong to the database schema. A database system may have user account data, which associates a user with a particular schema. When a user logins into a computer and establishes a session with the database system, the database system accesses user account data, selects for access by the user the schema defined for the user, and then permits the user access to the database objects in the schema.

Figure 3:
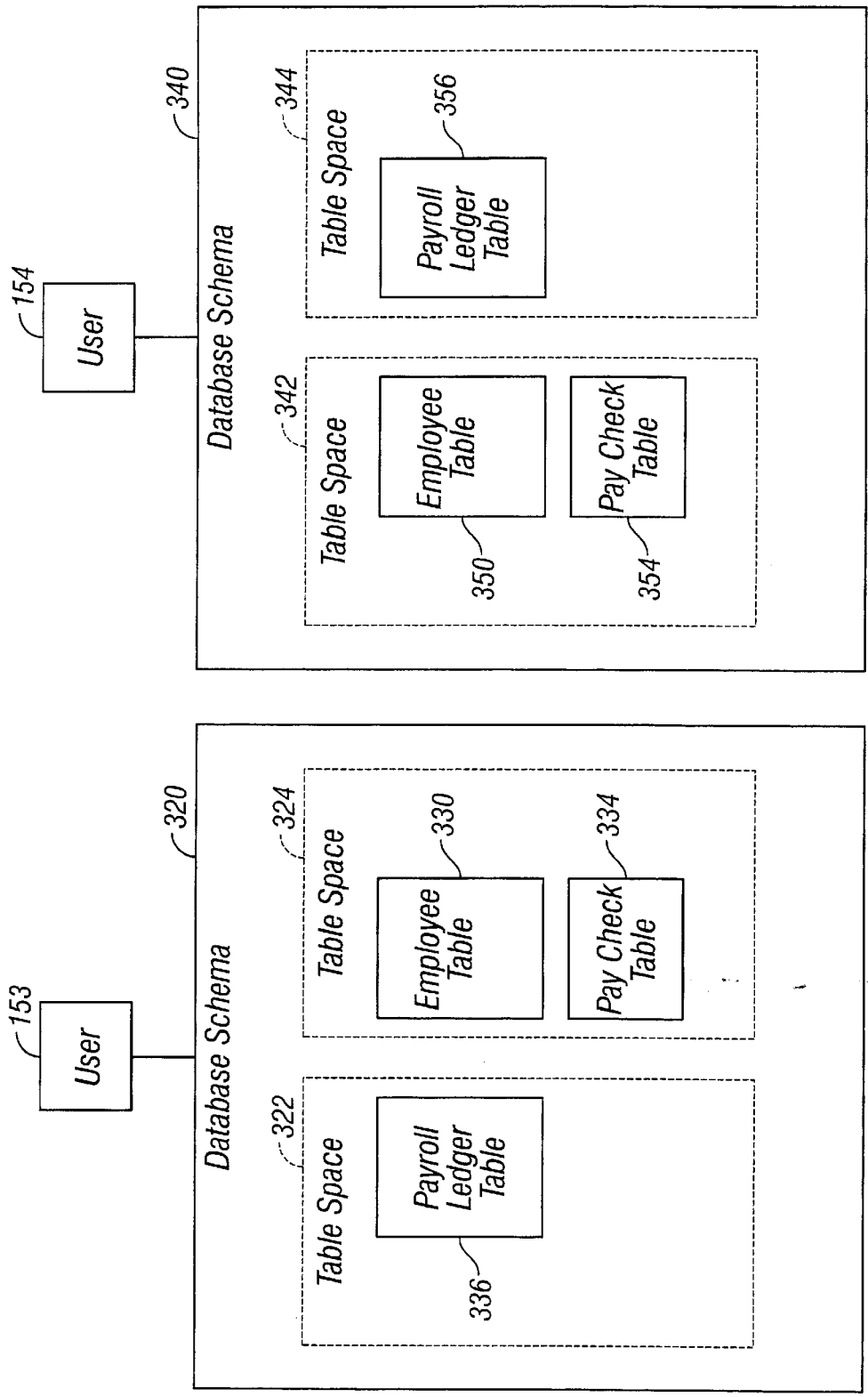
FIG. 3 is a block diagram that depicts use of database schemas in a database system to store users data in separate tablespaces.

FIG. 3 shows is a block diagram of database system 301, which illustrates how user data may be organized into separate sets of tablespaces using database schemas. Database Schema 320 includes tablespace 322 and 324. In addition, database schema 320 includes payroll ledger table 336 in tablespace 322, and employee table 330 and pay check table 334 in tablespace 324. Database Schema 340 includes tablespace 342 and 344. In addition, database schema 340 also includes payroll ledger table 356 in tablespace 342, and employee table 350 and pay check table 354 in tablespace 344.

When user 153 logins to database system 301, user 153 may access the data objects in database schema 320. When user 153 inserts data into any of these database objects, the data is stored in tables spaces that belong to the schema, i.e. tablespace 322 and tablespace 324. When user 154 logs into database system 301, user 154 may access the database objects in database schema 340. When user 154 inserts data into any of these database objects, the data is stored in tablespaces that belong to the schema, i.e. tablespace 342 and tablespace 344.

Use of transportable tablespaces, in combination with technique for mapping users to particular tablespaces, is advantageous to application hosting. A transportable tablespace may be used to transport data belonging to an application host customer more quickly than conventional techniques, such as the command generation approach. This reduces down time experienced by the customer of an application host when transporting their data to another database system. The reduced downtime lowers the cost of switching application hosts, or moving a host customer's data to a database system operated in house. Reduced down town also lowers costs for transferring a host customer's data between database systems managed by the application host, when, for example, the growth of a host customer's data requires that the data be moved to its own database system.

Hardware Overview

Figure 4:
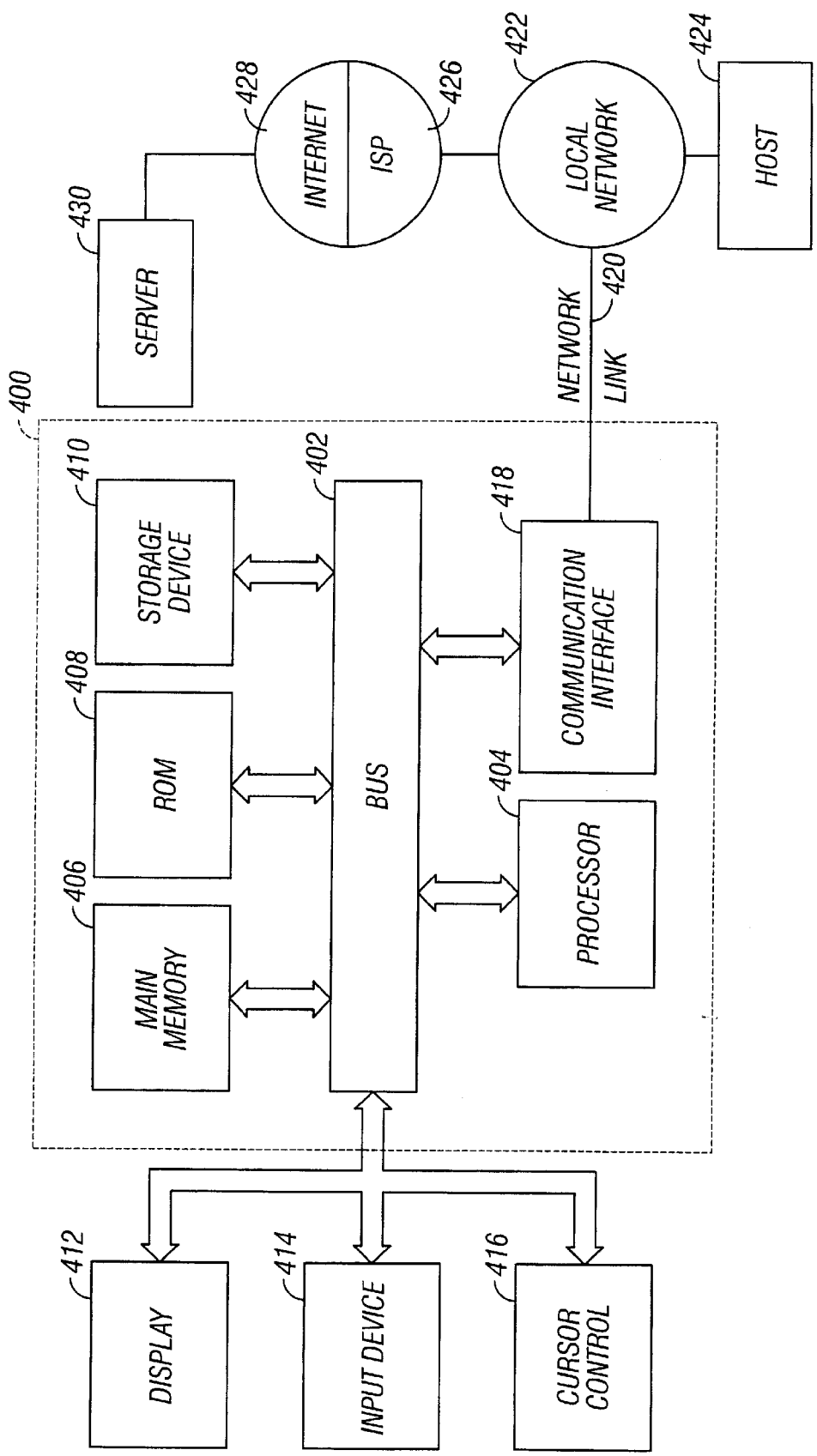
FIG. 4 is a block diagram of a computer system which may be used to implement an embodiment of the present invention.

FIG. 4 is a block diagram that illustrates a computer system 400 which may be used to implement an embodiment of the invention. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are implemented by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420.may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical'signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application implements the techniques described herein. The received code may be executed by processor 404 as it is received, and/or stored in storage device 410, or other non-volatile storage for later execution. In this manner, computer system 400 may obtain application code in the form of a carrier wave.

Pluggable Tablespaces

According to an embodiment of the present invention, transferring data between databases using transportable tablespaces is a two phase process. This process is illustrated using the databases depicted in FIGS. 5A and 5B.

Figure 5A:
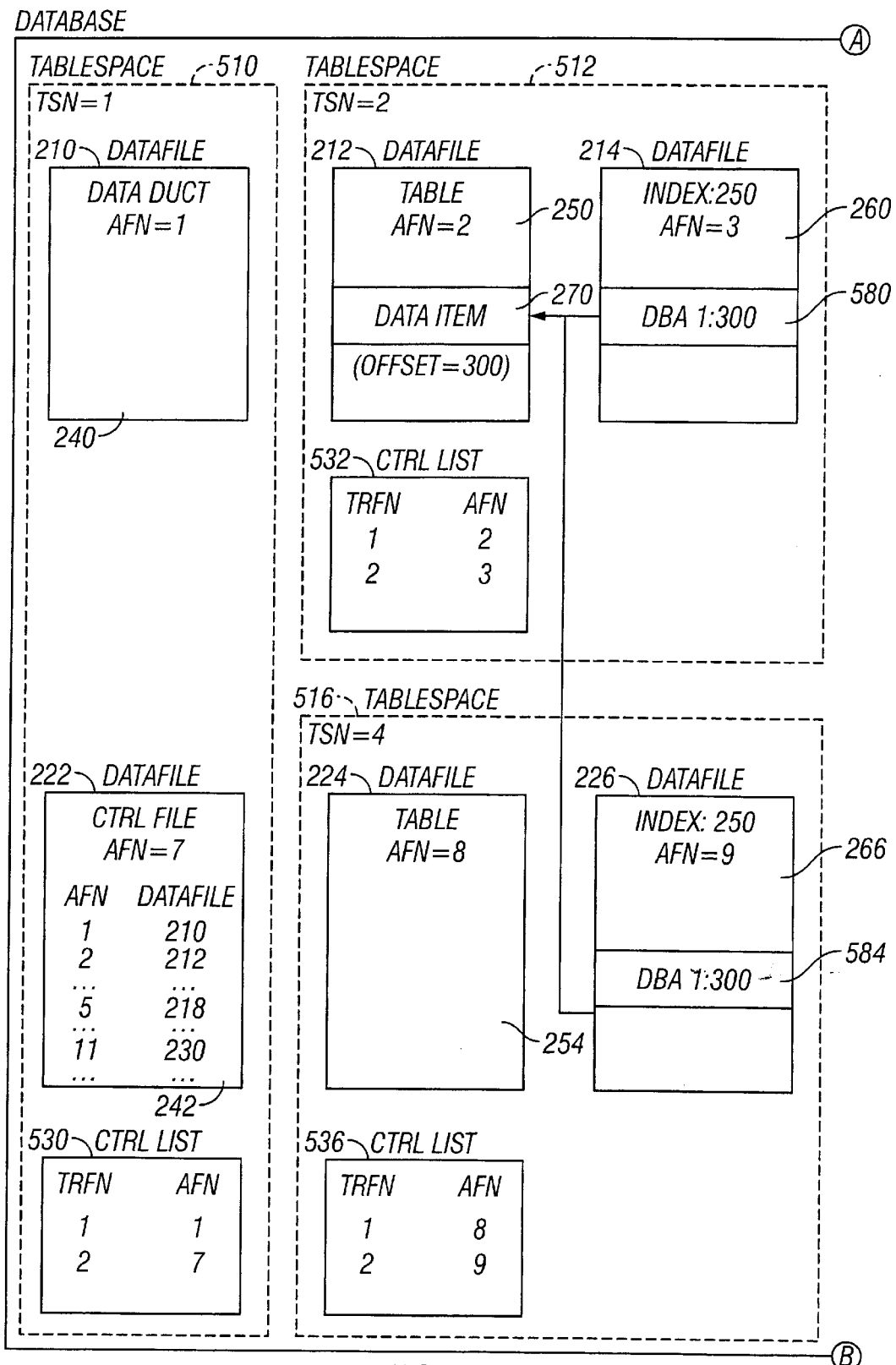
FIGS. 5A and 5B depict a source database according to an embodiment of the present invention.
Figure 5B:
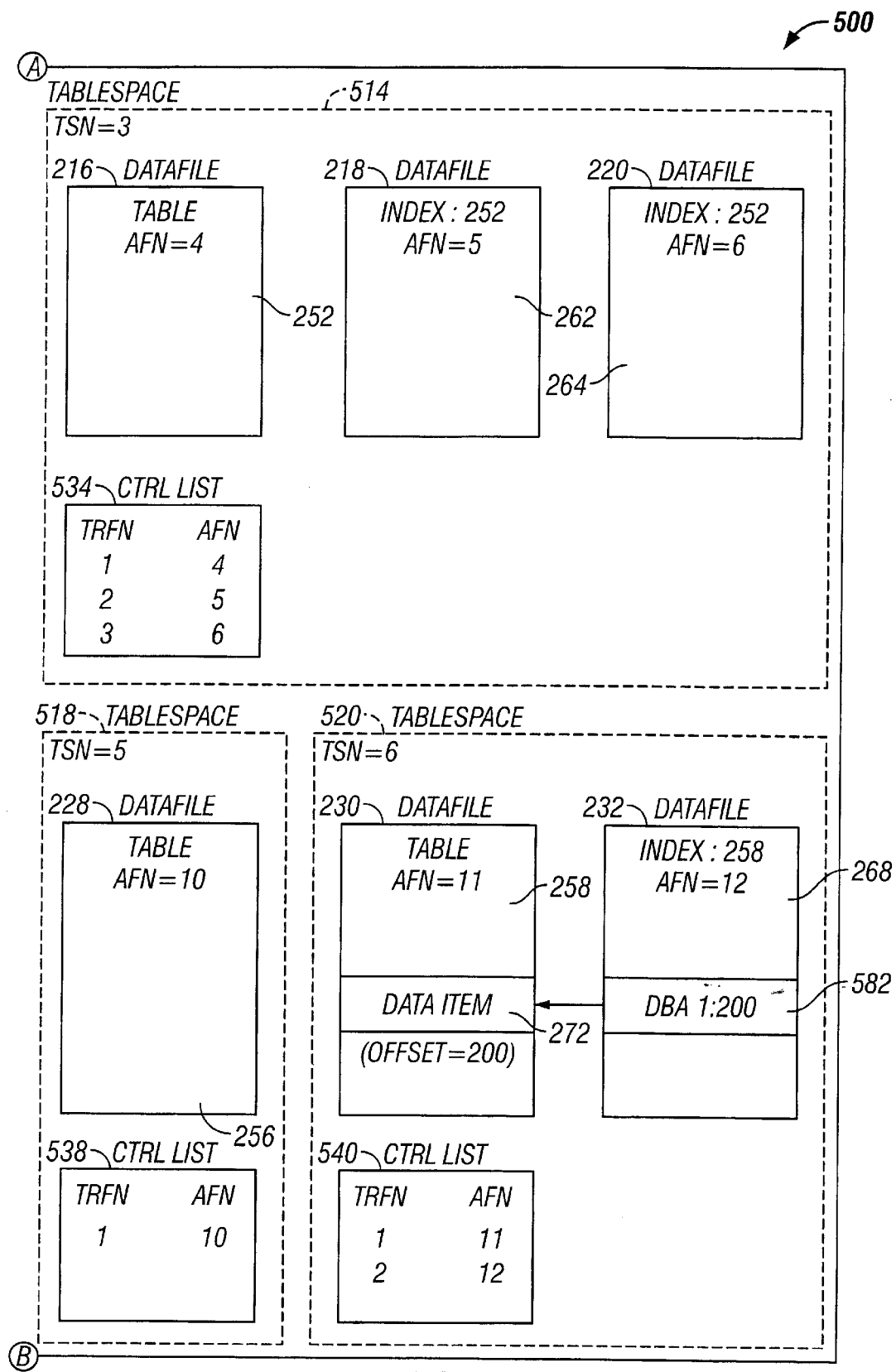

For example, database 500 includes six tablespaces as shown in FIGS. 5A and 5B. Database 500 comprises six tablespaces, 510 to 520. Datafiles 212 and 214 belong to tablespace 512, datafiles 216, 218, and 220 belong to tablespace 514, datafiles 210 and 222 belong to tablespace 510, datafiles 224 and 226 belong to tablespace 516, datafile 228 belongs to tablespace 518, and datafiles 230 and 232 belong to tablespace 520. System tablespace 510 comprises data dictionary 240 and control file 242 in data files 210 and 222, respectively.

In the first phase, a user "unplugs" a set of tablespaces, containing the desired data, from a source database. Unplugging a set of tablespaces is started by issuing an "unplug" command to a database system, which performs in response the steps shown in FIG. 9(*a*). At step 900, the database system gets a specification of the tablespaces to be transferred, called the "pluggable set." Step 910 receives the name of an export/import file from the user. For example, a user desiring to transfer the data in table 250 and index 260 from database 500 specifies tables 512 in the unplugging operation. With the pluggable set and the name of the export/import file, the source database produces a set of files (steps 904 and 906) that the user may then copy to a place accessible to the target database.

According to one embodiment of the invention, the unplug operation in step 906 removes the set of tablespaces from the source database; however, another embodiment of the invention leaves the set of tablespaces unchanged in the source database. A preferred embodiment of the invention enables both operations. In this situation, the former operation is termed "unplugging" a set of tablespaces, and the latter operation, "copying" a set of tablespaces.

Given a set of unplugged or copied tablespaces, the user may then plug the set of tablespaces into a target database by issuing a plug-in command with the name of export/import file. The metadata is reconstructed from the pluggable set and the plugged-in tablespaces become new tablespaces in the target database.

According to one embodiment of the invention, the target database performs the steps illustrated in FIG. 10(*a*). If the pluggable set is located at another site, the target computer system creates a local copy of the file (step 1000), perhaps in a temporary working directory. For example, the target computer system may receive a network transfer of a pluggable set or download the pluggable set from a World Wide Web site.

After the pluggable set is made available to the target system, the name of the export/import file is obtained from a user (step 1002) and the exported metadata in the export/import file is imported and reconstructed (step 1004). At step 1006, the individual tablespaces in the pluggable set are copied so that the tablespaces may used without patching disk pointers (step 1008).

According to another embodiment, the target database accesses the set of tablespaces without copying the tablespaces. In step 1010, the target system received the pluggable on a computer-readable medium in a drive. After prompting for the name of the export/import file (step 1012) and importing the metadata (step 1014), the target system accesses the tablespaces in the pluggable set directly (step 1016), without patching the disk pointers (step 1018).

In a preferred embodiment, both approaches are permitted according to the presence or absence of a "read-only" option. If the read-only option is not specified, then the tablespaces are copied in; on the other hand, if the read-only option is specified, then the tablespaces are used in the drive directly. The read-only option is useful with plugging in tablespaces published on a CD-ROM, because the target database will use the tablespaces by reading the CD-ROM drive without copying the tablespaces into the target database.

The two difficulties in the prior art due to the internal structure of databases are handled by using tablespace-relative disk pointers to avoid disk pointer patching and by exporting/importing only the metadata associated with the transferred set of tablespaces.

Tablespace-relative Disk Pointers

When a tablespace is created within a database, it is assigned a tablespace number (TSN), which is unique for that database. Each tablespace contains a control list of datafiles, containing a tablespace-relative file number (TRFN) and the corresponding datafile. Thus tablespaces 510 to 520 each include control lists 530 to 540. In particular, tablespace 512 includes control list 532, which has entries indicating that a datafile having TRFN of 1 corresponds to the datafile having an AFN of 2. Likewise, a datafile with a TRFN of 2 corresponds to the datafile with an AFN of 3.

A TRFN is unique among the datafiles of a given tablespace, but need not be unique among all the datafiles of a database. In the current example, tablespace 512 has a TSN of 2 and control list 532. Datafile 212 of tablespace 512 has a TRFN of 1 according to control list 532, yet datafile 230 in tablespace 520 also has a TRFN of 1 according to control list 540. Thus, both datafile 212 and datafile 230 have the same TRFN, but they are distinct datafiles. However, the TSNs are different: tablespace 520 has a TSN of 6, and tablespace 512 has a TSN of 2.

Any datafile can be identified by a TRFN in conjunction with a TSN of the tablespace containing a control list with an entry for that TRFN, using the following procedure. Given a TSN and a TRFN, the control list of the tablespace corresponding to the TSN is inspected. The control list entry with the TRFN is fetched, yielding the AFN for the datafile. With the AFN, the operating system information describing how to open the datafile is fetched from the control file, and datafile is opened, if necessary. In the current example, given a TSN of 4 and a TRFN of 1, control list 536 is inspected because it belongs to tablespace 516 having the TSN of 4. From control list 536 the entry for a TRFN of 1 is fetched, yielding an AFN of 8. Looking up the entry for an AFN of 8 in control file 242, datafile 224 is identified. Thus, a TSN:TRFN pair uniquely identifies a particular datafile.

Since a single AFN may be derived from a pair numbers consisting of a TSN and a TRFN, this pair of numbers can replace the AFN in data block address. A tablespace-relative DBA, therefore, is a data block address which uses a TSN, a TRFN, and a file offset to specify the location of a data block. The TSN and TRFN are used to find the proper AFN. The datafile identified by the AFN is opened, and the data block is fetched from the file offset. Looking up the proper AFN from a TSN:TRFN pair may be done by inspecting each control list individually, but in a preferred embodiment, all the TSN:TRFN:AFN triples of the database are cached in an open hash table kept in main memory, allowing rapid look up. Any other data structure that can store triples, such as an array, linked list, or tree, may used as well.

The tablespace number for a disk pointer can be derived from the operating context in which the disk pointer is used. Specifically, every disk pointer is associated with a unique tablespace, because each disk pointer is associated with a specific purpose according to metadata in the data dictionary. For example, disk pointers found in an index are associated with the specific table in a specific tablespace upon which the index was built. In the example, disk pointer 580 is found in index 260 built on table 250. Table 250 resides in tablespace 512 with a TSN of 2. Therefore, disk pointer 580 is associated with tablespace 512 and a TSN of 2 can be derived for that disk pointer. Similarly, disk pointer 584 is found in index 266 also built on table 250. Accordingly, disk pointer 584 has a derivable TSN of 2.

When a disk pointer is read from a datafile, the database system can obtain a TSN for the disk from the operating context. Therefore, the TSN of a tablespace-space DBA need not be stored in a disk pointer embedded in a datafile, allowing the portion of a disk pointer allocated for the AFN to indicate the TRFN instead. Such a disk pointer is a "tablespace-relative disk pointers." Disk pointers not embedded within a datafile, such as those disk pointers found in recovery logs, are stored with the proper TSN. However, recovery logs are not transferred from database to database and do not therefore pertain transferring data between databases.

Figure 8:
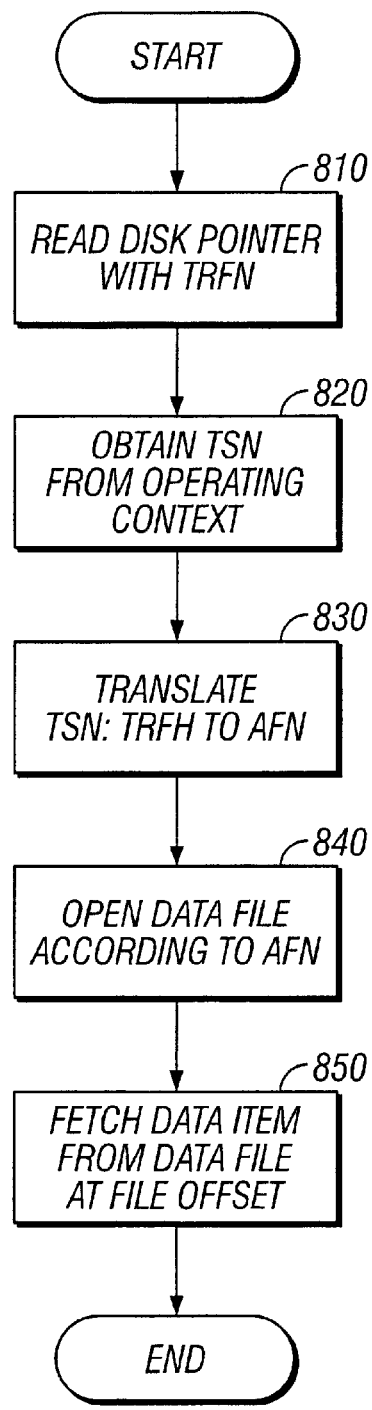
FIG. 8 is a flowchart illustrating how a data item pointed to by a tablespace-relative pointer is fetched.

When disk pointers are stored in a datafile in tablespace-relative format, the method for accessing the data block pointed by a tablespace-relative disk pointer is shown in FIG. 8. In step 810, the disk pointer containing a TRFN and a file offset is read from a datafile. In the next step 820, a TSN is obtained from an operating context. For a disk pointer read from an index, the TSN is the TSN of the tablespace in which the base table for the index is contained. For example the TSN for disk pointer 280, obtained from the operating context, is 1, because index 260 was built on table 250 in tablespace 512 having a TSN of 1.

Proceeding to step 830, the TSN:TRFN pair is translated into an AFN. In the example, the TRFN of 1 is looked up in control list 532 of tablespace 512 with a TSN of 1, and an AFN of 2 is fetched. In a preferred embodiment, an open hash table containing the entries of all the control lists in database 500 is consulted for the AFN. Next, in step 840, the AFN is used to open the corresponding datafile according to the operating system specific information stored for the entry belonging to the AFN. In the example, an AFN of 2 specifies datafile 212. Once the datafile is opened, the data item is fetched from (step 850).

Figure 6:
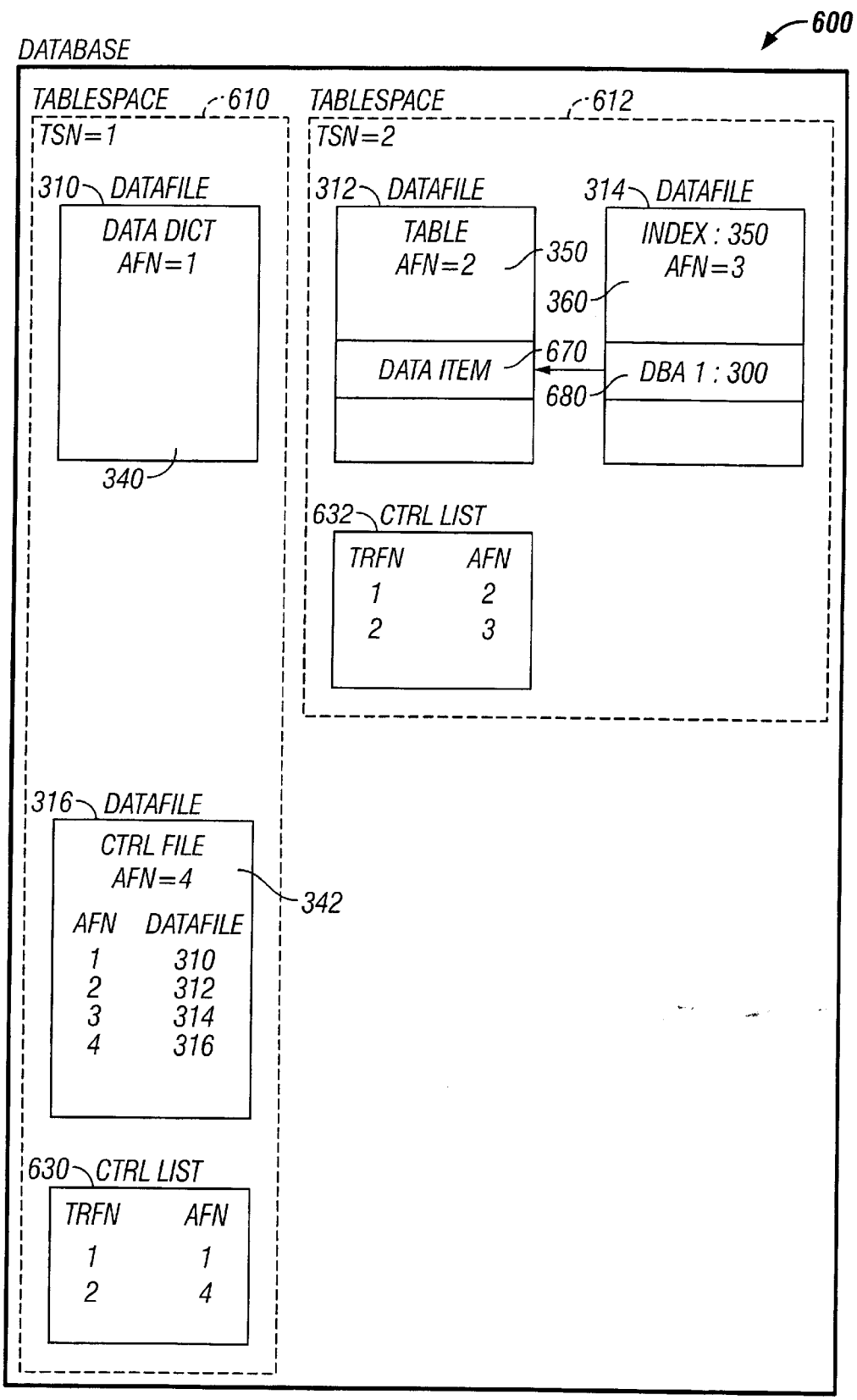
FIG. 6 is a depiction of a destination database according to an embodiment of the present invention.

Tablespace-relative disk pointers allow datafile disk pointers to be copied without having to be patched. FIG. 6 shows a destination database 600 with two tablespaces, 610 and 612. Tablespace 612 comprises two datafiles, 312 and 314, and control list 632. Datafile 314 is an index, index 360, built on table 350, and contains tablespace-relative disk pointer 680 with a tablespace-relative DBA of 1:300, pointing to data item 670 in table 350. Copying tablespace 512 of database 500 yields database 700 in FIG. 7(*a*). Disk pointer 580 maintains the same value, 1:300, but still points to data item 270, even in database 700. During the plugging in process tablespace 512 is copied or accessed without patching any of its disk pointers in datafile 212 or 214. The administrative information in the control list 532 indicating the mapping between the TRFNs for tablespace 512 is reconstituted as described below. Non-dangling disk pointer 580 has the identical value in database 700 as in database 500. However, tablespace-relative disk pointer 580 still points to data item 270, because the TSN for disk pointer 680 is 1, and control list 532 maintains that a TRFN of 1 indicates datafile 212. Thus, tablespace-relative disk pointers avoid the aliasing problem associated with the absolute disk pointer technology.

Figure 7A:
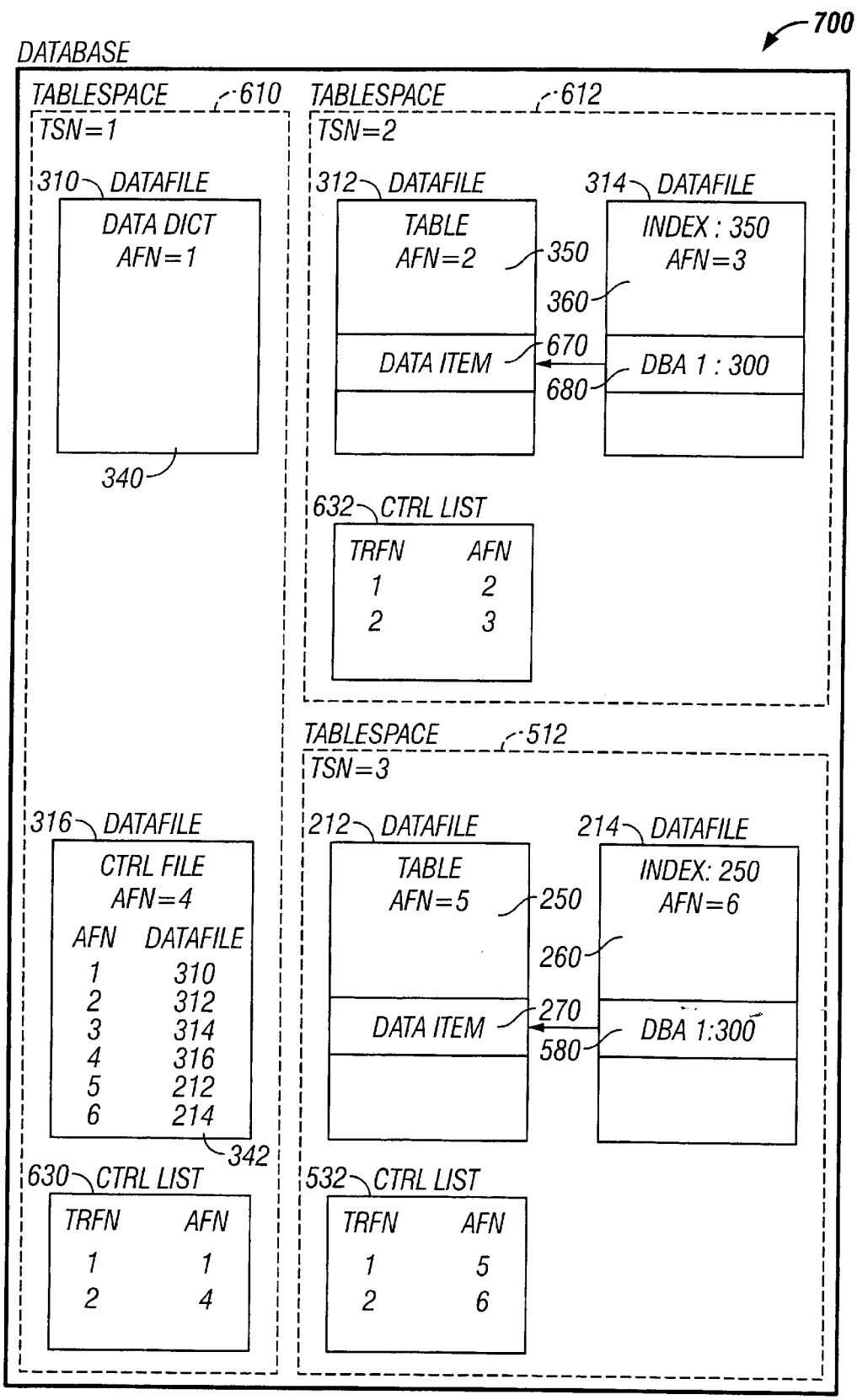
FIGS. 7(a), 7(b) and 7(c) are depictions of plugging in a tablespace according to an embodiment of the invention.
Figure 7B:
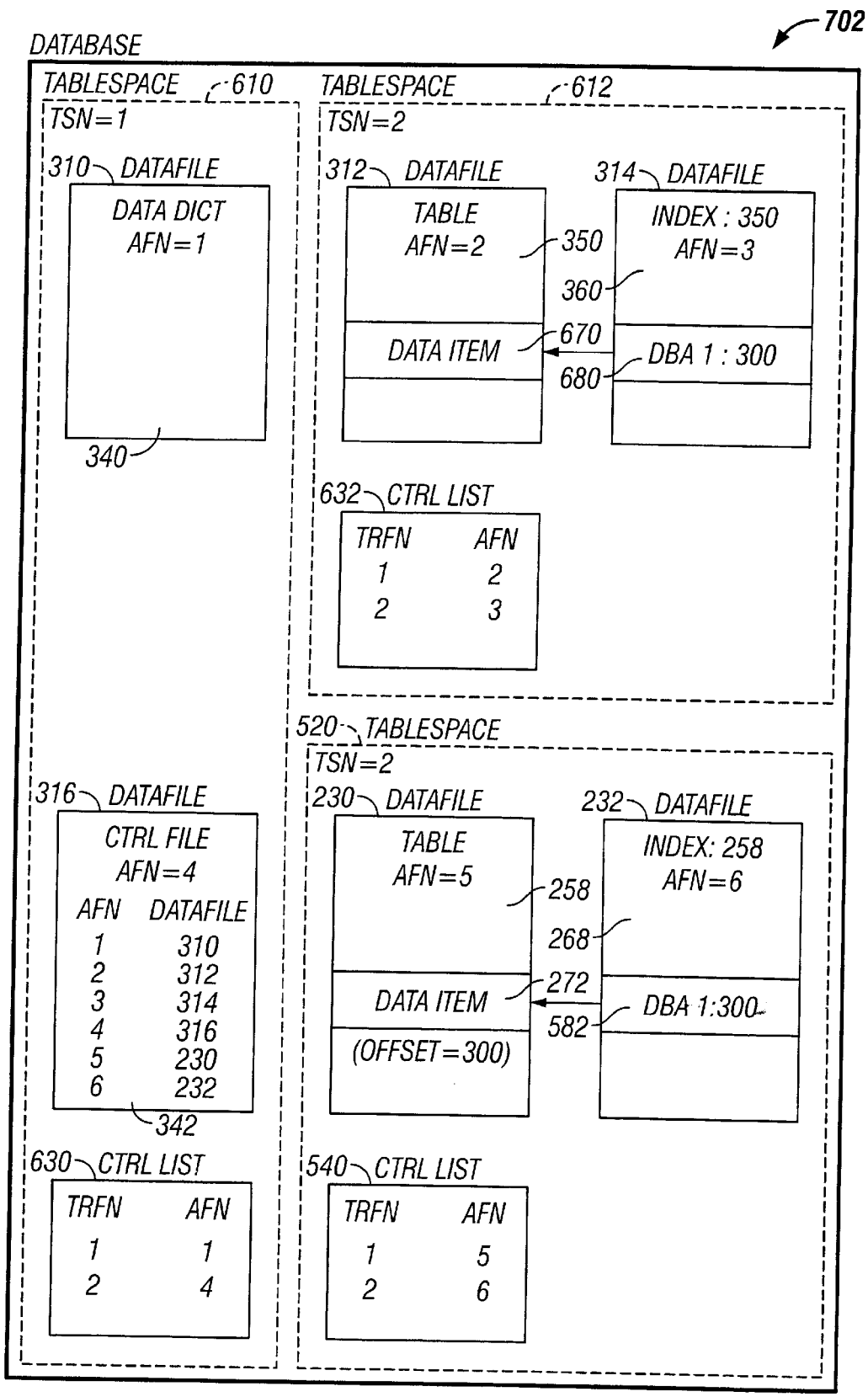

Tablespace-relative disk pointers also remain valid after being transferred to a target database. FIG. 7(*b*) illustrates the result, database 702, of plugging tablespace 520 of database 500 into database 600. Tablespace-relative disk pointer 582 contains the same value of source database 500, 1:300. However, disk pointer 582 continues to point to data item 272, because the tablespace relative file number portion of the disk pointer is still valid.

Therefore, patching tablespace-relative disk pointers is avoided because only the corresponding control list is modified. All disk pointers are stored in tablespace-relative format, so that no disk pointer will have to be patched in either the unplugging or plugging in process.

Integrating Metadata

Metadata concerning a set of tablespaces contains information about the objects in the tablespace. These objects include, for example, tables, clusters, indexes, partitioned tables, and referential integrity constraints. Metadata also includes information about space allocation in those tablespaces.

Some objects are related to associated with other objects. For example, indexes are typically associated with tables. An index that is built on a table contains database pointers to that table. As another example, referential integrity constraints can associate with several tables. In addition, all partitions of a table are related to each other. The database system typically keeps track of these relationships in a data dictionary. Therefore, the database system is able to determine whether a set of tablespaces, the "pluggable set," contains pointers outside the pluggable set.

Figure 9A:
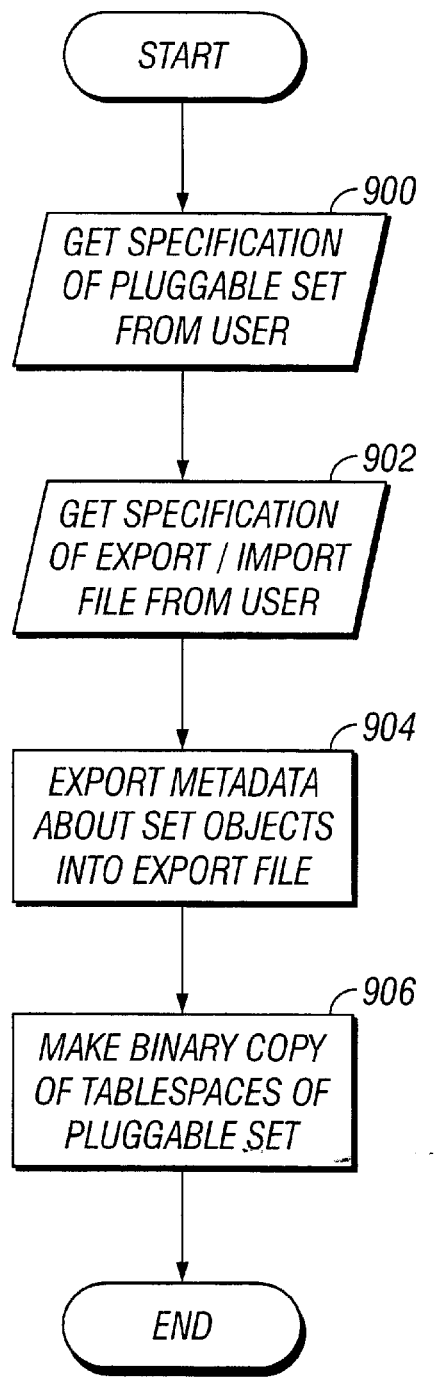

According to an embodiment of the invention, dangling pointers are avoided by ensuring that the pluggable set is self-contained when the pluggable set is created. With reference to FIG. 9(b), during the metadata export process, the pluggable set is checked whether it is self-contained (step 910). If the pluggable set is not self-contained, then all objects that may contain pointers to objects outside the pluggable set are dropped from the tablespace (step 912). After the pluggable set was made self-consistent, then metadata for the remaining objects in the pluggable set is exported (step 914).

Figure 7C:
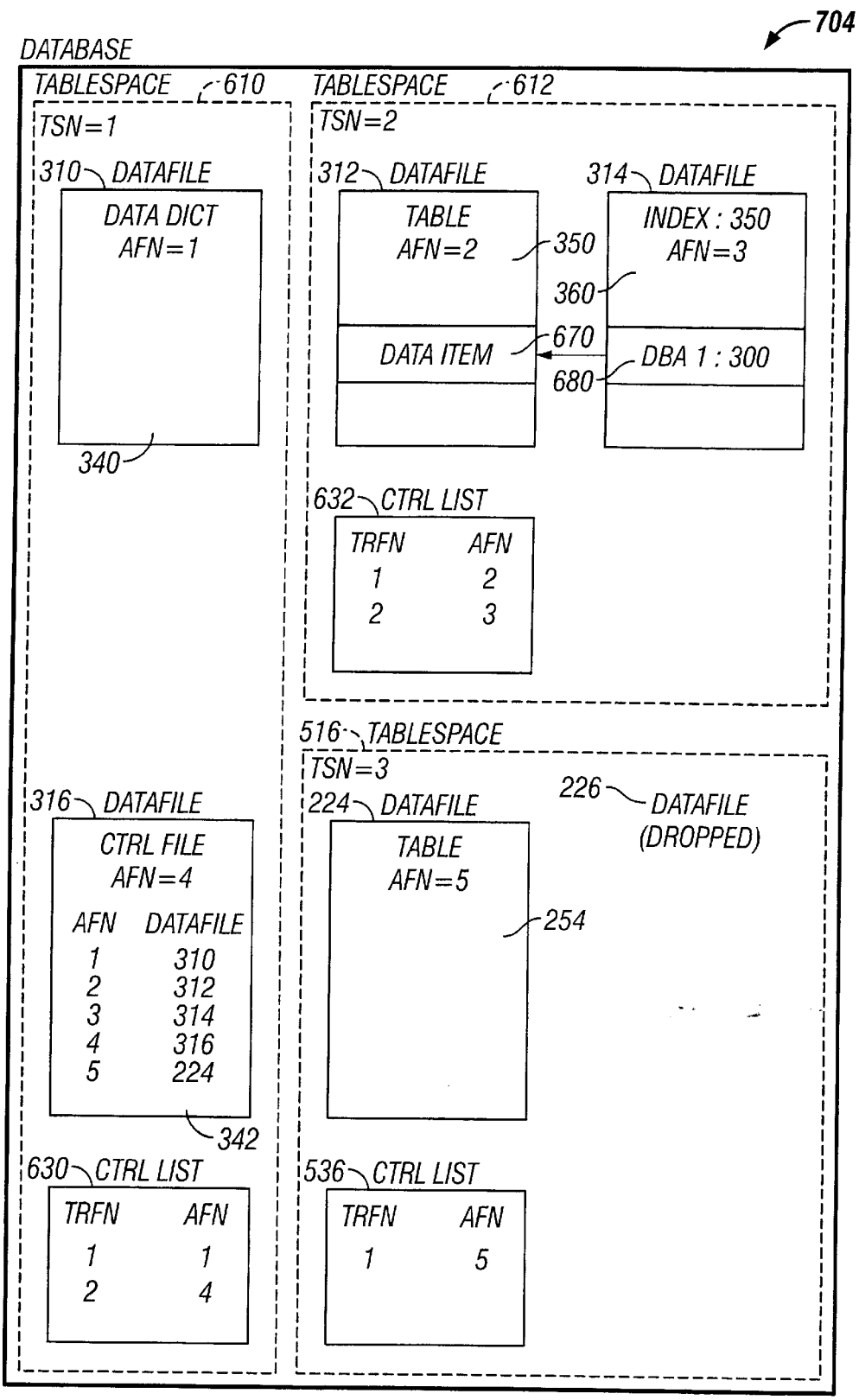

For example, when tablespace 516 as the only tablespace in a pluggable set is unplugged from database 500, the database system inspects the objects in the tablespace, table 254 and index 266. Index 266 is built on table 250, which is found in tablespace 512, which is not in the pluggable set. Therefore, the database will drop index 266 from unplugged tablespace 516. Accordingly, when the pluggable set is plugged into database 600 the result is shown in FIG. 7(c), where only table 254 is transferred to database 704.

On the other hand, when a pluggable set is copied instead of unplugged, the database system prompts the user when the pluggable set is not self-contained. Referring to FIG. 9(c), the database system determines whether the pluggable set is self-contained (step 920). If the pluggable set is not self-contained, then the database system signals errors to the user if there are objects that may contain dangling pointers (step 922). This step allow the user to either drop those objects or change the pluggable set in order to make the pluggable set self-contained. Once the pluggable set is determined to be self-contained, then metadata is exported (step 924).

In the example, if tablespace 516 is being copies, the database system determines that index 266 may contain pointers outside the pluggable set, because it is built on a table outside of the pluggable set. When the user is prompted, the user may allow index 266 to be dropped from the pluggable set or expand the pluggable set to include tablespace 512, which contains the table, table 250, upon which index 266 was built. In either case, the result is a self-contained pluggable set.

When the pluggable set is created in plug-in format, all the metadata information in the data dictionary about all objects in the pluggable set is exported in DDL format into an export/import file. This information includes data about tables, indexes, referential integrity constraints, and space allocation. For an object in the pluggable set, such as a table, part of the exported information includes a tablespace-relative pointer to the location of the object. The actual values of tablespace-relative pointers remain valid, but new tablespace numbers are assigned for the tablespaces in the pluggable set. The active control list information about tablespace numbering is kept in the data dictionary.

Figure 10A:
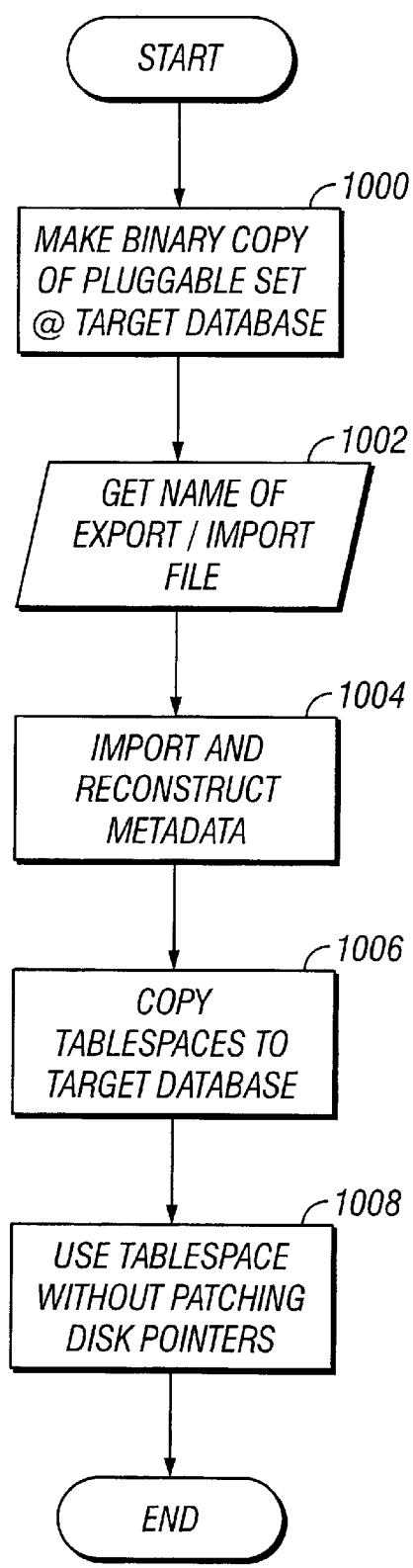
FIGS. 10(a), 10(b), and 10(c) are flowcharts illustrating the operation of plugging a set of tablespaces into a database according to embodiments of the present invention.
Figure 10B:
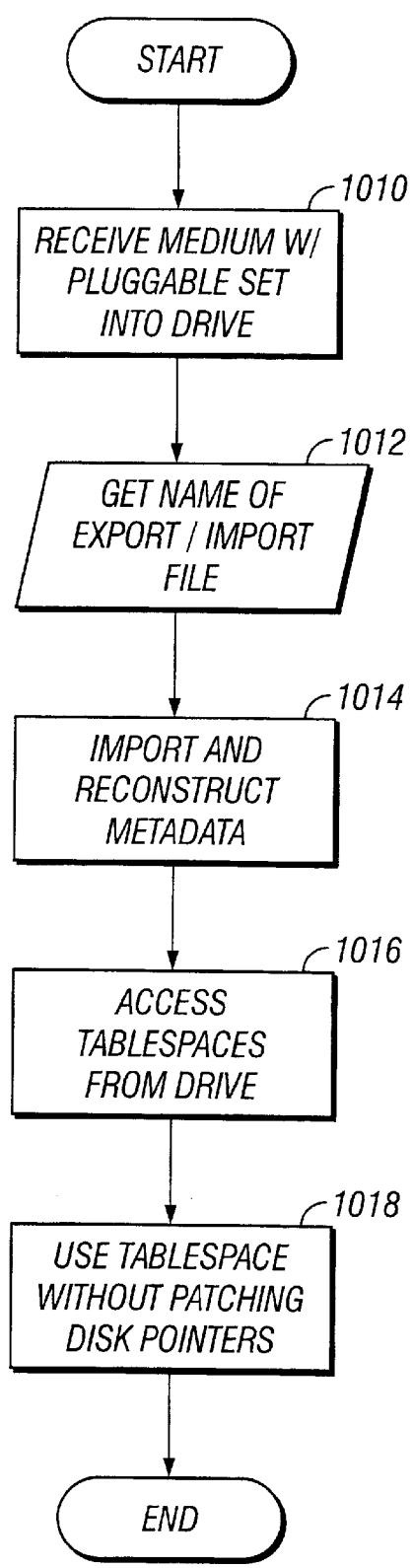

To plug the pluggable set in a target database, the export/import file is made accessible to the target database, for example, by copying the file to the target database system; see step 1000 of FIG. 10(a). In another embodiment, the export/import file is made accessible by loading a CD-ROM with the pluggable set into a CD-ROM drive accessible to the computer system running the target database; see step 1010 of FIG. 10(b).

Figure 10C:
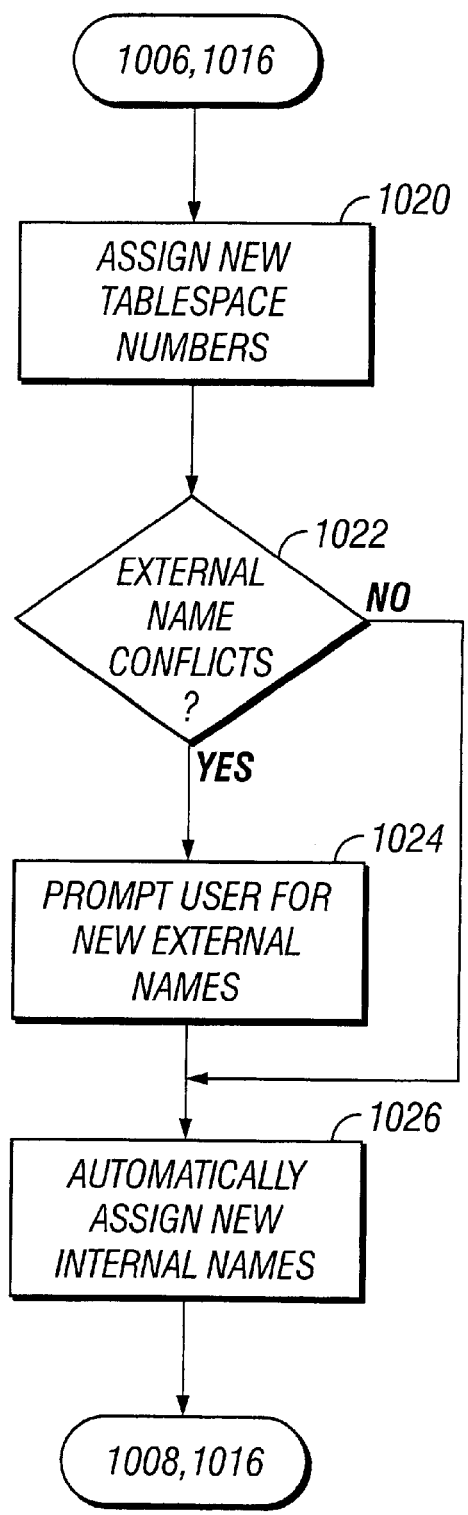

The metadata for the pluggable set is reconstructed using the DLL statements in the export/import file and inserted into the target database's data dictionary (steps 1004 and 1014), the steps of which are illustrated in FIG. 10(c). In step 1020, the tablespaces in the pluggable set are assigned new tablespace numbers.

One issue with importing metadata is name conflicts. There are two kinds of name conflicts, external and internal. An external name is the name, usually in the form of a string, by which a user refers to a particular object. For example, a table may have an external name of "sales," and an external name conflict occurs when both the pluggable set and the target database contain a table called "sales." An internal name is typically used by a database system to keep track of the identity of objects. Some databases call the internal name of an object an object number. When a pluggable set is plugged in, some of the external and internal name may already be in use in the target database.

External name conflicts are resolved with help from the user. When metadata is being reconstructed for a pluggable set, the external name of an object, present in the metadata, is checked to determine whether the name is already being used in the database (step 1022). If that name is in use, then the plug-in procedure signals an error, giving the user a chance to change the offending name in the target database and re-execute the plug-in procedure (step 1024).

A special case occurs when a data warehouse is periodically refreshed with tablespaces from an OLTP database. In this case, the user should drop the tablespaces in the data warehouse before plugging a more recent version of the pluggable set from the OLTP database into the data warehouse. This procedure avoids a potentially large number of external name conflicts.

Internal name conflicts are resolved automatically during the plug-in process (step 1026). While the metadata is being imported into a target database, new objects are simply assigned a new internal name and propagated to other objects in the pluggable set that refer to them.

CD-ROM Publishing

A particular aspect of pluggable tablespaces allows for CD-ROM publishing. A set of tablespaces containing the data to be published is impressed onto a CD-ROM in plug-in format. The CD-ROM is distributed to the target database by conventional means (e.g., by mail, overnight delivery, file transfer protocol). At the target site, the CD-ROM pluggable set is plugged into a target database, by loading the CD-ROM into a CD-ROM drive of the target computer system. After the set of tablespaces is thus available, the metadata contained on the CD-ROM is imported into the target database. Since the user data of the CD-ROM pluggable set is already in native format, the tablespaces in the pluggable set need not be converted or even copied and may remain in the CD-ROM driver, conserving disk space of the target site.

Plugging in a set of tablespaces without changing the datafiles in the tablespaces is possible because the tablespace-relative pointers in the datafiles need not be patched. Furthermore, with a "read-only" option, the database can remember that the information in the pluggable set is read-only by storing such an indication in the data dictionary and control files.

Other aspects of the invention allows for publishing a pluggable set on to other transportable media. For example, one embodiment of the invention publishes the pluggable set on a magnetic disk, such as a floppy disk. Another embodiment publishes the pluggable set on a magnetic table, such as a magnetic tape cartridge or magnetic tape reel.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of plugging in a pluggable set of tablespaces having a plurality of disk pointers into a target database, comprising the computer-implemented steps of:

incorporating metadata into said target database, said metadata describing said tablespace and data therein;

copying each tablespace of said pluggable set of tablespaces into said target database; and locating a data item associated with any one of said plurality of disk pointers without patching any disk pointer of said plurality of disk pointers.

2. The method of claim 1, wherein the step of incorporating metadata into said target database includes the step of executing commands in a file that specify instructions for generating said metadata, wherein said commands are generated by a source database for said pluggable set of tablespaces.

3. The method of claim 1, wherein the step of incorporating metadata includes:

examining said pluggable set of tablespaces to determine one or more attributes of said pluggable set of tablespaces to be defined by metadata; and generating metadata based on said examination of said pluggable set of tablespaces.

4. The method of claim 1, wherein the step of incorporating metadata includes receiving user input that specifies instructions for generating said metadata.

5. The method of claim 4, wherein the step of incorporating metadata includes incorporating metadata that defines one or more columns for said pluggable set of tablespaces.

6. A computer-readable medium carrying one or more sequences of instructions for plugging in a pluggable set of tablespaces having a plurality of disk pointers into a target database, wherein execution of the one or more sequences of instructions by one or more processors causes the one or more processors to perform the steps of:

incorporating metadata into said target database, said metadata describing said tablespace and data therein;

copying each tablespace of said pluggable set of tablespaces into said target database; and locating a data item associated with any one of said plurality of disk pointers without patching any disk pointer of said plurality of disk pointers.

7. The computer-readable medium of claim 6, wherein the step of incorporating metadata into said target database includes the step of executing commands in a file that specify instructions for generating said metadata, wherein said commands are generated by a source database for said pluggable set of tablespaces.

8. The computer-readable medium of claim 6, wherein the step of incorporating metadata includes:

examining said pluggable set of tablespaces to determine one or more attributes of said pluggable set of tablespaces to be defined by metadata; and generating metadata based on said examination of said pluggable set of tablespaces.

9. The computer-readable medium of claim 6, wherein the step of incorporating metadata includes receiving user input that specifies instructions for generating said metadata.

10. The computer-readable medium of claim 6, wherein the step of incorporating metadata includes incorporating metadata that defines one or more columns for said pluggable set of tablespaces.

11. A database system configured for plugging in a pluggable set of tablespaces having a plurality of disk pointers into a target database, wherein said database system is configured to perform the steps of:

incorporating metadata into said target database, said metadata describing said tablespace and data therein;

copying each tablespace of said pluggable set of tablespaces into said target database; and locating a data item associated with any one of said plurality of disk pointers without patching any disk pointer of said plurality of disk pointers.

12. The database system of claim 11, wherein the step of incorporating metadata into said target database includes the step of executing commands in a file that specify instructions for generating said metadata, wherein said commands are generated by a source database for said pluggable set of tablespaces.

13. The database system of claim 11, wherein the step of incorporating metadata includes:

examining said pluggable set of tablespaces to determine one or more attributes of said pluggable set of tablespaces to be defined by metadata; and generating metadata based on said examination of said pluggable set of tablespaces.

14. The database system of claim 11, wherein the step of incorporating metadata includes receiving user input that specifies instructions for generating said metadata.

15. The database system of claim 11, wherein the step of incorporating metadata includes incorporating metadata that defines one or more columns for said pluggable set of tablespaces.

16. A computer system configured for plugging in a pluggable set of tablespaces having a plurality of disk pointers into a target database, wherein said computer comprises:

means for incorporating metadata into said target database, said metadata describing said tablespace and data therein;

means for copying each tablespace of said pluggable set of tablespaces into said target database; and means for locating a data item associated with any one of said plurality of disk pointers without patching any disk pointer of said plurality of disk pointers.

17. The computer system of claim 16, wherein incorporating metadata into said target database includes executing commands in a file that specify instructions for generating said metadata, wherein said commands are generated by a source database for said pluggable set of tablespaces.

18. The computer system of claim 16, wherein incorporating metadata includes:
   examining said pluggable set of tablespaces to determine one or more attributes of said pluggable set of tablespaces to be defined by metadata; and
   generating metadata based on said examination of said pluggable set of tablespaces.

19. The computer system of claim 16, wherein incorporating metadata includes receiving user input that specifies instructions for generating said metadata.

20. The computer system of claim 16, wherein incorporating metadata includes incorporating metadata that defines one or more columns for said pluggable set of tablespaces.

* * * * *